United States Patent
Chauhan et al.

(10) Patent No.: US 8,261,340 B2
(45) Date of Patent: *Sep. 4, 2012

(54) USING STATISTICAL ANALYSIS TO GENERATE EXCEPTION RULES THAT ALLOW LEGITIMATE MESSAGES TO PASS THROUGH APPLICATION PROXIES AND GATEWAYS

(75) Inventors: Abhishek Chauhan, Los Gatos, CA (US); Rajiv Mirani, Los Gatos, CA (US); Prince Kohli, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 199 days.

This patent is subject to a terminal disclaimer.

(21) Appl. No.: 12/694,902

(22) Filed: Jan. 27, 2010

(65) Prior Publication Data
US 2010/0132029 A1 May 27, 2010

Related U.S. Application Data

(63) Continuation of application No. 10/782,739, filed on Feb. 18, 2004, now Pat. No. 7,890,996.

(51) Int. Cl.
*H04L 29/06* (2006.01)
(52) U.S. Cl. .................. 726/13; 726/12; 726/14
(58) Field of Classification Search .................. None
See application file for complete search history.

(56) References Cited

U.S. PATENT DOCUMENTS

| | | | |
|---|---|---|---|
| 4,941,089 A | 7/1990 | Fischer | |
| 5,341,477 A | 8/1994 | Pitkin et al. | |
| 5,457,797 A | 10/1995 | Butterworth et al. | |
| 5,699,528 A | 12/1997 | Hogan | |
| 5,796,727 A | 8/1998 | Harrison et al. | |
| 5,835,726 A | 11/1998 | Shwed et al. | |
| 5,931,917 A | 8/1999 | Nguyen et al. | |
| 5,949,975 A | 9/1999 | Batty et al. | |
| 5,951,694 A | 9/1999 | Choquier et al. | |
| 5,983,208 A | 11/1999 | Haller et al. | |
| 5,996,076 A | 11/1999 | Rowney et al. | |
| 5,999,179 A | 12/1999 | Kekic et al. | |
| 6,006,264 A | 12/1999 | Colby et al. | |
| 6,018,731 A | 1/2000 | Bertrand et al. | |
| 6,022,315 A | 2/2000 | Iliff | |
| 6,026,386 A | 2/2000 | Lannert et al. | |
| 6,029,156 A | 2/2000 | Lannert et al. | |
| 6,029,158 A | 2/2000 | Bertrand et al. | |
| 6,072,942 A | 6/2000 | Stockwell et al. | |

(Continued)

OTHER PUBLICATIONS

Farrow, R., "CSI 1997 Firewalss Matrix [An Analaysis of Current Firewall Technologies]", Rik Farrow's 1997 Firewall Product Analysis; www.gocsi.com/farrowpa.htm; Dec. 23, 2003, 5 pages.

(Continued)

*Primary Examiner* — Benjamin Lanier
(74) *Attorney, Agent, or Firm* — Foley and Lardner LLP; Christopher J. McKenna

(57) ABSTRACT

A security gateway receives messages rejected by a message filter based on a set of rules. The security gateway also receives attributes of the rejected messages that triggered the rules. The security gateway maintains frequencies with which the messages with a particular attribute were rejected by the rules. The security gateway finds rejected messages or attributes having a high frequency of occurrence. Since messages or attributes having a high frequency of occurrences are more likely to represent legitimate requests rather than malicious attacks, the security gateway generates exception rules, which would allow messages that have similar attributes to pass through the gateway.

20 Claims, 5 Drawing Sheets

U.S. PATENT DOCUMENTS

| | | |
|---|---|---|
| 6,073,127 A | 6/2000 | Lannert et al. |
| 6,101,489 A | 8/2000 | Lannert et al. |
| 6,101,531 A | 8/2000 | Eggleston et al. |
| 6,202,096 B1 | 3/2001 | Williams et al. |
| 6,205,211 B1 | 3/2001 | Thomas et al. |
| 6,206,829 B1 | 3/2001 | Iliff |
| 6,253,326 B1 | 6/2001 | Lincke et al. |
| 6,272,537 B1 | 8/2001 | Kekic et al. |
| 6,289,382 B1 | 9/2001 | Bowman-Amuah |
| 6,295,513 B1 | 9/2001 | Thackston |
| 6,304,915 B1 | 10/2001 | Nguyen et al. |
| 6,332,163 B1 | 12/2001 | Bowman-Amuah |
| 6,333,931 B1 | 12/2001 | LaPier et al. |
| 6,339,832 B1 | 1/2002 | Bowman-Amuah |
| 6,343,318 B1 | 1/2002 | Hawkins et al. |
| 6,345,239 B1 | 2/2002 | Bowman-Amuah |
| 6,368,110 B1 | 4/2002 | Koenecke et al. |
| 6,370,355 B1 | 4/2002 | Ceretta et al. |
| 6,397,259 B1 | 5/2002 | Lincke et al. |
| 6,400,996 B1 | 6/2002 | Hoffberg et al. |
| 6,427,132 B1 | 7/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,449,627 B1 | 9/2002 | Baer et al. |
| 6,466,654 B1 | 10/2002 | Cooper et al. |
| 6,477,580 B1 | 11/2002 | Bowman-Amuah |
| 6,477,665 B1 | 11/2002 | Bowman-Amuah |
| 6,482,156 B2 | 11/2002 | Iliff |
| 6,487,283 B2 | 11/2002 | Thomas et al. |
| 6,496,850 B1 | 12/2002 | Bowman-Amuah |
| 6,498,955 B1 | 12/2002 | McCarthy et al. |
| 6,502,102 B1 | 12/2002 | Haswell et al. |
| 6,502,135 B1 | 12/2002 | Munger et al. |
| 6,502,213 B1 | 12/2002 | Bowman-Amuah |
| 6,505,241 B2 | 1/2003 | Pitts |
| 6,515,968 B1 | 2/2003 | Combar et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,542,880 B2 | 4/2003 | Rosenfeld et al. |
| 6,546,425 B1 | 4/2003 | Hanson et al. |
| 6,549,893 B1 | 4/2003 | Lannert et al. |
| 6,549,949 B1 | 4/2003 | Bowman-Amuah |
| 6,550,012 B1 | 4/2003 | Villa et al. |
| 6,550,057 B1 | 4/2003 | Bowman-Amuah |
| 6,564,320 B1 | 5/2003 | de Silva et al. |
| 6,571,282 B1 | 5/2003 | Bowman-Amuah |
| 6,571,285 B1 | 5/2003 | Groath et al. |
| 6,578,068 B1 | 6/2003 | Bowman-Amuah |
| 6,584,493 B1 | 6/2003 | Butler |
| 6,584,569 B2 | 6/2003 | Reshef et al. |
| 6,590,588 B2 | 7/2003 | Lincke et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,609,128 B1 | 8/2003 | Underwood |
| 6,611,822 B1 | 8/2003 | Beams et al. |
| 6,611,840 B1 | 8/2003 | Baer et al. |
| 6,611,867 B1 | 8/2003 | Bowman-Amuah |
| 6,615,199 B1 | 9/2003 | Bowman-Amuah |
| 6,615,253 B1 | 9/2003 | Bowman-Amuah |
| 6,618,761 B2 | 9/2003 | Munger et al. |
| 6,629,081 B1 | 9/2003 | Cornelius et al. |
| 6,633,878 B1 | 10/2003 | Underwood |
| 6,636,242 B2 | 10/2003 | Bowman-Amuah |
| 6,636,585 B2 | 10/2003 | Salzberg et al. |
| 6,640,145 B2 | 10/2003 | Hoffberg et al. |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,658,398 B1 | 12/2003 | Bertrand et al. |
| 6,664,978 B1 | 12/2003 | Kekic et al. |
| 6,668,253 B1 | 12/2003 | Thompson et al. |
| 6,671,818 B1 | 12/2003 | Mikurak |
| 6,678,355 B2 | 1/2004 | Eringis et al. |
| 6,691,227 B1 | 2/2004 | Neves et al. |
| 6,691,301 B2 | 2/2004 | Bowen et al. |
| 6,697,824 B1 | 2/2004 | Bowman-Amuah |
| 6,701,514 B1 | 3/2004 | Haswell et al. |
| 6,704,873 B1 | 3/2004 | Underwood |
| 6,712,701 B1 | 3/2004 | Boylan, III et al. |
| 6,715,145 B1 | 3/2004 | Bowman-Amuah |
| 6,718,535 B1 | 4/2004 | Underwood |
| 6,721,286 B1 | 4/2004 | Williams et al. |
| 6,731,609 B1 | 5/2004 | Hirni et al. |
| 6,742,015 B1 | 5/2004 | Bowman-Amuah |
| 6,757,362 B1 | 6/2004 | Cooper et al. |
| 6,772,214 B1 | 8/2004 | McClain et al. |
| 6,772,347 B1 | 8/2004 | Xie et al. |
| 6,775,692 B1 | 8/2004 | Albert et al. |
| 6,785,653 B1 | 8/2004 | White et al. |
| 6,788,315 B1 | 9/2004 | Kekic et al. |
| 6,792,615 B1 | 9/2004 | Rowe et al. |
| 6,826,616 B2 | 11/2004 | Larson et al. |
| 6,834,310 B2 | 12/2004 | Munger et al. |
| 6,839,701 B1 | 1/2005 | Baer et al. |
| 6,839,759 B2 | 1/2005 | Larson et al. |
| 6,842,906 B1 | 1/2005 | Bowman-Amuah |
| 6,849,045 B2 | 2/2005 | Iliff |
| 6,850,252 B1 | 2/2005 | Hoffberg |
| 6,877,043 B2 | 4/2005 | Mallory et al. |
| 6,879,965 B2 | 4/2005 | Fung et al. |
| 6,882,634 B2 | 4/2005 | Bagchi et al. |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,904,449 B1 | 6/2005 | Quinones |
| 6,907,473 B2 | 6/2005 | Schmidt et al. |
| 6,907,546 B1 | 6/2005 | Haswell et al. |
| 6,912,571 B1 | 6/2005 | Serena |
| 6,928,396 B2 | 8/2005 | Thackston |
| 6,928,473 B1 | 8/2005 | Sundaram et al. |
| 6,944,596 B1 | 9/2005 | Gray et al. |
| 6,954,800 B2 | 10/2005 | Mallory |
| 6,975,655 B2 | 12/2005 | Fischer et al. |
| 6,981,047 B2 | 12/2005 | Hanson et al. |
| 6,981,143 B2 | 12/2005 | Mullen et al. |
| 6,985,879 B2 | 1/2006 | Walker et al. |
| 6,985,901 B1 | 1/2006 | Sachse et al. |
| 6,985,922 B1 | 1/2006 | Bashen et al. |
| 6,986,102 B1 | 1/2006 | Baer et al. |
| 6,988,126 B2 | 1/2006 | Wilcock et al. |
| 6,988,138 B1 | 1/2006 | Alcorn et al. |
| 6,988,236 B2 | 1/2006 | Ptasinski et al. |
| 6,993,101 B2 | 1/2006 | Trachewsky et al. |
| 6,993,513 B2 | 1/2006 | Beams et al. |
| 6,996,605 B2 | 2/2006 | Low et al. |
| 7,000,019 B2 | 2/2006 | Low et al. |
| 7,000,031 B2 | 2/2006 | Fischer et al. |
| 7,006,881 B1 | 2/2006 | Hoffberg et al. |
| 7,006,893 B2 | 2/2006 | Hart et al. |
| 7,007,034 B1 | 2/2006 | Hartman, Jr. et al. |
| 7,025,209 B2 | 4/2006 | Hawkins |
| 7,035,285 B2 | 4/2006 | Holloway et al. |
| 7,043,488 B1 | 5/2006 | Baer et al. |
| 7,047,279 B1 | 5/2006 | Beams et al. |
| 7,069,234 B1 | 6/2006 | Cornelius et al. |
| 7,069,291 B2 | 6/2006 | Graves et al. |
| 7,076,494 B1 | 7/2006 | Baer et al. |
| 7,085,834 B2 | 8/2006 | Delany et al. |
| 7,089,239 B1 | 8/2006 | Baer et al. |
| 7,100,195 B1 | 8/2006 | Underwood |
| 7,107,226 B1 | 9/2006 | Cassidy et al. |
| 7,117,165 B1 | 10/2006 | Adams et al. |
| 7,124,101 B1 | 10/2006 | Mikurak |
| 7,127,432 B2 | 10/2006 | Rubin et al. |
| 7,128,270 B2 | 10/2006 | Silverbrook et al. |
| 7,130,807 B1 | 10/2006 | Mikurak |
| 7,136,645 B2 | 11/2006 | Hanson et al. |
| 7,143,089 B2 | 11/2006 | Petras et al. |
| 7,152,092 B2 | 12/2006 | Beams et al. |
| 7,167,844 B1 | 1/2007 | Leong et al. |

| | | |
|---|---|---|
| 7,171,615 B2 | 1/2007 | Jensen et al. |
| 7,181,696 B2 | 2/2007 | Brock |
| 7,188,180 B2 | 3/2007 | Larson et al. |
| 7,200,571 B1 | 4/2007 | Jenniges et al. |
| 7,209,949 B2 | 4/2007 | Mousseau et al. |
| 7,313,822 B2 | 12/2007 | Ben-Itzhak et al. |
| 2002/0049608 A1 | 4/2002 | Hartsell et al. |
| 2002/0049841 A1 | 4/2002 | Johnson et al. |
| 2002/0059274 A1 | 5/2002 | Hartsell et al. |
| 2002/0065864 A1 | 5/2002 | Hartsell et al. |
| 2002/0095400 A1 | 7/2002 | Johnson et al. |
| 2002/0098840 A1 | 7/2002 | Hanson et al. |
| 2002/0105972 A1 | 8/2002 | Richter et al. |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0116452 A1 | 8/2002 | Johnson et al. |
| 2002/0133593 A1 | 9/2002 | Johnson et al. |
| 2002/0138572 A1 | 9/2002 | Delany et al. |
| 2002/0169887 A1 | 11/2002 | MeLampy et al. |
| 2002/0174227 A1 | 11/2002 | Hartsell et al. |
| 2003/0023873 A1 | 1/2003 | Ben-Itzhak |
| 2003/0046577 A1 | 3/2003 | Silverman |
| 2003/0084165 A1 | 5/2003 | Kjellberg et al. |
| 2003/0115331 A1 | 6/2003 | Xie et al. |
| 2003/0120811 A1 | 6/2003 | Hanson et al. |
| 2003/0182423 A1 | 9/2003 | Shafir et al. |
| 2003/0182431 A1 | 9/2003 | Sturniolo et al. |
| 2003/0226038 A1 | 12/2003 | Raanan et al. |
| 2003/0236837 A1 | 12/2003 | Johnson et al. |
| 2003/0236861 A1 | 12/2003 | Johnson et al. |
| 2003/0236919 A1 | 12/2003 | Johnson et al. |
| 2004/0107360 A1 | 6/2004 | Herrmann et al. |
| 2004/0190092 A1 | 9/2004 | Silverbrook et al. |
| 2004/0210320 A1 | 10/2004 | Pandya |
| 2004/0250124 A1 | 12/2004 | Chesla et al. |
| 2004/0268357 A1 | 12/2004 | Joy et al. |
| 2004/0268358 A1 | 12/2004 | Darling et al. |
| 2005/0086206 A1 | 4/2005 | Balasubramanian et al. |
| 2005/0193075 A1 | 9/2005 | Haff et al. |
| 2005/0223114 A1 | 10/2005 | Hanson et al. |
| 2005/0223115 A1 | 10/2005 | Hanson et al. |
| 2005/0286466 A1 | 12/2005 | Tagg et al. |

OTHER PUBLICATIONS

Reumann, John, et al. "Adaptive Packet Filters;" Department of Electircal Engineering and Computer Science; The University of Michigan, Ann Arbor, MI 48109-2122; 5 pages.
Ranum, Marcus J., Thinking About Firewalls; Trusted Information Systems, Inc., Glenwood Maryland, 10 pages.
Final office action dated May 8, 2009 U.S. Appl. No. 10/782,726.
Office action dated Jan. 12, 2009 U.S. Appl. No. 10/782,726.
Advisory Action dated Sep. 22, 2008 U.S. Appl. No. 10/782,726.
Final office action dated Jul. 10, 2008 U.S. Appl. No. 10/782,726.
Office action dated Feb. 1, 2008 U.S. Appl. No. 10/782,726.
Office action dated Jul. 17, 2007 U.S. Appl. No. 10/782,726.
Advisory Action dated Jul. 29, 2008 U.S. Appl. No. 10/782,739.
Office action dated Nov. 17, 2009 U.S. Appl. No. 10/782,726.
Final office action dated Mar. 17, 2008 (8 pages) U.S. Appl. No. 10/782,739.
Office action dated Jul. 19, 2007 (9 pages) U.S. Appl. No. 10/782,739.
Final office action dated Oct. 30, 2008 (8 pages) U.S. Appl. No. 10/782,739.
Final office action dated Aug. 21, 2009 U.S. Appl. No. 10/782,739.
Notice of Allowance dated Oct. 27, 2009 U.S. Appl. No. 10/782,739.
Notice of Allowance for U.S. Appl. No. 10/782,726 dated Apr. 18, 2010.
Notice of Allowance on U.S. Appl. No. 10/782,739 dated Oct. 25, 2010.

USING STATISTICAL ANALYSIS TO GENERATE EXCEPTION RULES THAT ALLOW LEGITIMATE MESSAGES TO PASS THROUGH APPLICATION PROXIES AND GATEWAYS

RELATED APPLICATIONS

This present application claims priority to and is a continuation of U.S. patent application Ser. No. 10/782,739, entitled "USING STATISTICAL ANALYSIS TO GENERATE EXCEPTION RULES THAT ALLOW LEGITIMATE MESSAGES TO PASS THROUGH APPLICATION PROXIES AND GATEWAYS", filed Feb. 18, 2004, incorporated herein by reference.

FIELD OF THE DISCLOSURE

The present disclosure relates generally to web application security systems, and more particularly, to using application behavior to generate exception rules to allow legitimate messages to pass through application proxies and gateways.

BACKGROUND

Corporations are rapidly deploying web-based applications to automate business processes and to facilitate real-time interaction with customers, business partners and employees. Highly vulnerable to malicious hackers, web applications provide an entry point through which sensitive data can be accessed and stolen. Given the vulnerability of web applications, establishing a web application protection is critical for any enterprise that is exposing sensitive data or transaction systems over the Internet.

Firewalls are an essential component in a corporate entity's network security plan. They represent a security enforcement point that separates a trusted network from an untrusted network. Firewalls determine which traffic should be allowed and which traffic should be disallowed based on a predetermined security policy.

Firewall systems designed to protect web applications are known. They are commonly implemented as application proxies or application gateways. An application proxy is an application program that runs on a firewall system between two networks and acts as an intermediary between a web client and a web server. When client requests are received at the firewall, the final server destination address is determined by the application proxy software. The application proxy translates the address, performs additional access control checking, and connects to the server on behalf of the client. An application proxy authenticates users and determines whether user requests are legitimate.

Two approaches for implementing application firewalls are known—a positive security model, which enforces positive behavior; and a negative security model, which blocks recognized attacks.

A negative security model blocks recognized attacks by relying on a database of expected attack signatures. This model operates similar to an anti-virus software and is referred to as a "blacklist" solution. All the incoming requests are compared against the known signatures. If a known attack is identified, the request is blocked. One downside of this approach is that a signature list needs to be always kept up-to-date. Otherwise, when a new request comes in that is not on the signature list, it will be passed to the server for processing. As a result, illegitimate traffic can get through.

A positive security model enforces positive behavior by learning the application logic and then building a security policy of valid known requests as a user interacts with the application. This approach explores all possible entry points, such as URLs, in a web application, and generates a set of allowable user actions for a particular application program. Messages that match some of the allowable actions are allowed. The rest of the messages are blocked. This solution is commonly referred to as a "whitelist" technique. One problem with this approach is that the generated list of allowable actions is static. As a result, when the application program changes, some of the rules become obsolete. In addition, certain situations, such as extensive use of JavaScript or deliberate deviations of the application from its usual behavior can generate a large number of false positives, i.e., illegitimately blocked messages. Since some of the blocked messages may represent legitimate requests rather than malicious attacks, the existing model blocks messages which may turn out to be legitimate.

Accordingly, what is needed is a web application security technique that generates exception rules to the rules that block legitimate traffic.

SUMMARY

A security gateway receives messages rejected by a message filter based on a set of rules. The security gateway extracts attributes of the rejected messages that triggered the rules. The security gateway maintains frequencies with which the messages with a particular attribute were rejected by the rules. The security gateway finds rejected messages or attributes having a high frequency of occurrence. Since messages or attributes having a high frequency of occurrences are more likely to represent legitimate requests rather than malicious attacks, the security gateway generates exception rules, which would allow messages that have similar attributes to pass through the gateway.

In one embodiment, initially, messages or components thereof are received by a message filter. Examples of the received messages are URL requests, forms, and other client-server communications. The message filter extracts attributes from the messages. The attributes may be data from the message, or derived values from the data, such as statistical information. Some messages will be rejected because they trigger at least one rejection rule used by the message filter. Exemplary rules used by the message filter are: an immutable property for a given cookie cannot be modified, a form field cannot exceed a certain number of characters, a URL that is not on the list of allowed URLs can not pass.

An adaptive filter receives rejected messages along with an indication of the rule (or rules) that has caused a rejection and an attribute (or attributes) of the message that triggered the rule. The adaptive filter generates a rejection list that includes a message, rule, and attribute of the message that triggered the rejection and passes the rejection list to a learning engine.

A frequency is maintained to indicate a number of occurrences a message with a particular attribute was rejected by a rule. These frequencies create a distribution of different rule violations in terms of various message attributes. The learning engine determines which frequencies exceed a threshold and generates an exception rule to the message filter's rejection rule which rejected the message containing the attribute. Exception rules thus describe attributes with high frequency occurrences. Exception rules are provided to the adaptive filter, which allows messages to pass according to the exception rules.

Alternatively, the functionality of the adaptive filter is embedded into the message filter. The generated exception rules are provided to the message filter. The message filter is configured to traverse to the exception rules directly from the filtering rules. The message filter allows messages to pass through the security gateway according to the exception rules.

The security gateway is adapted to generate exception rules for rejected URL messages according to another embodiment. In this embodiment, all rejected URLs are stored in a trie structure. Each node in the trie structure is associated with a component of a URL message. A frequency count is maintained at each node to indicate a number of occurrences of URLs which were rejected. The learning engine traverses the trie structure to select a node (or nodes) to generate a cut. A cut is a collection of nodes for which exception rules will be generated. Nodes that are selected for the cut meet a set of constraints with respect the frequency information. The learning engine generates an exception rule that will allow a URL associated with the selected node and its descendants to pass.

DETAILED DESCRIPTION

1. System Architecture Overview

Figure 1:
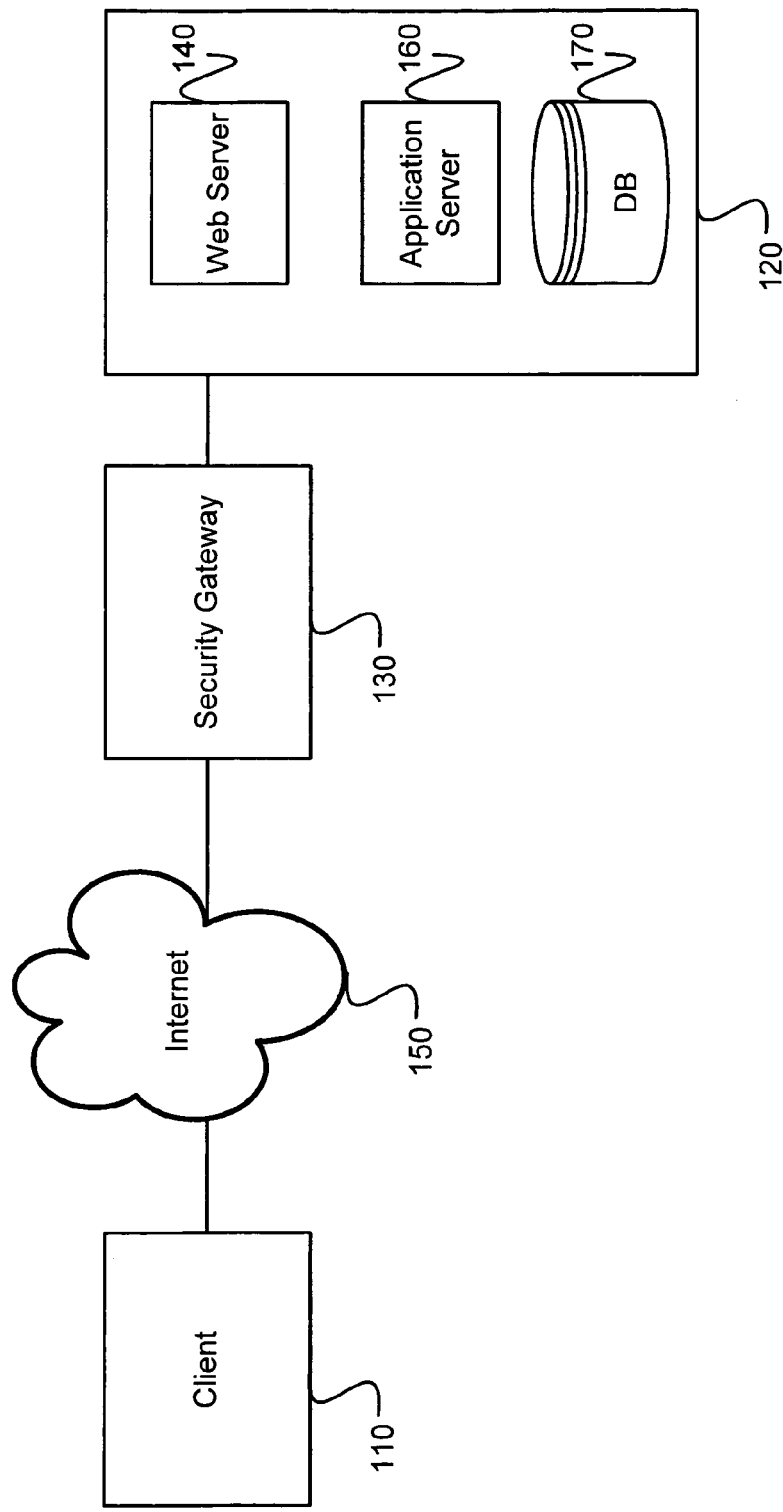
FIG. 1 is a block diagram of environment in which the invention operates.

FIG. 1 is a block diagram of an environment 100 in which the invention operates. The environment 100 includes a client system 110 and a server system 120 connected by a communication network 150. A security gateway 130 is interposed between and connected to client 110 and server 120. Although this invention is described in the context of the client-server architecture, it should be understood that the invention can be implemented in any other suitable architecture, such as a peer-to-peer architecture where each system 110 and 120 can be a client and a server.

As used herein, the term "server system" 120 simply denotes those aspects of the software program associated with a remote computer, as well as underlying operating system and hardware support. As will be understood by those of skill in the art, a server system 120 within the context of the present invention can comprise components of the software program, as well as components of the operating system of a remote computer and hardware components of a remote computer. Server system 120 may include a web infrastructure, such as a web server 140, an application server 160, and a database 170. Web server 140 is a computer running software for serving content across the Internet, such as for example Microsoft Internet Information Server (IIS), or Apache. Web server 140 responds to requests received from client system 110 by transmitting HTML pages across the Internet for display by a web browser (not shown) that is running on client system 110. Application server 160 is a program that handles all application operations between users an enterprise's back-end business applications or databases. Database 170, in turn, stores all data relevant to the enterprises' operations. The server system 120 may comprise one or more computers for implementing the above described functionality and services.

As used herein, the term client system 110 simply denotes those aspects of the software program associated with a user's computer, as well as underlying operating system and hardware support. As will be understood by those of skill in the art, a client system 110 within the context of the present invention can comprise components of the software program, as well as components of the operating system of a user's computer and hardware components of a user's computer. Client system 110 includes a web browsing functionality. While FIG. 1 illustrates a single client system 110, it is appreciated that in actual practice there will be any number of client systems 110 that communicate with the server system 120.

In one implementation, security gateway 130 operates as a proxy in that it is installed directly in front of server 120. In yet another implementation, security gateway 130 operates as a gateway between the public Internet and an internal network (not shown), such as a WAN, or LAN. This implementation ensures that all incoming and outgoing messages are inspected for compliance with defined security policies so that all of the network's assets can be protected against new, yet-undefined threats. Network administrators can validate application security policies before deployment.

Communication network 150 can be the Internet, and particularly, the World Wide Web portion thereof. However, it will also be appreciated that communication network 150 can be any known communication network.

Security gateway 130 rejects messages based on a set of rules. Security gateway 130 gathers statistical data to determine the frequencies with which messages with a particular attribute were rejected. Security gateway 130 compares the frequencies to a threshold. Security gateway 130 generates exception rules for high frequency messages or attributes thereof, which rules would allow messages that have similar attributes to pass through security gateway 130 according to the exceptions.

Figure 2:
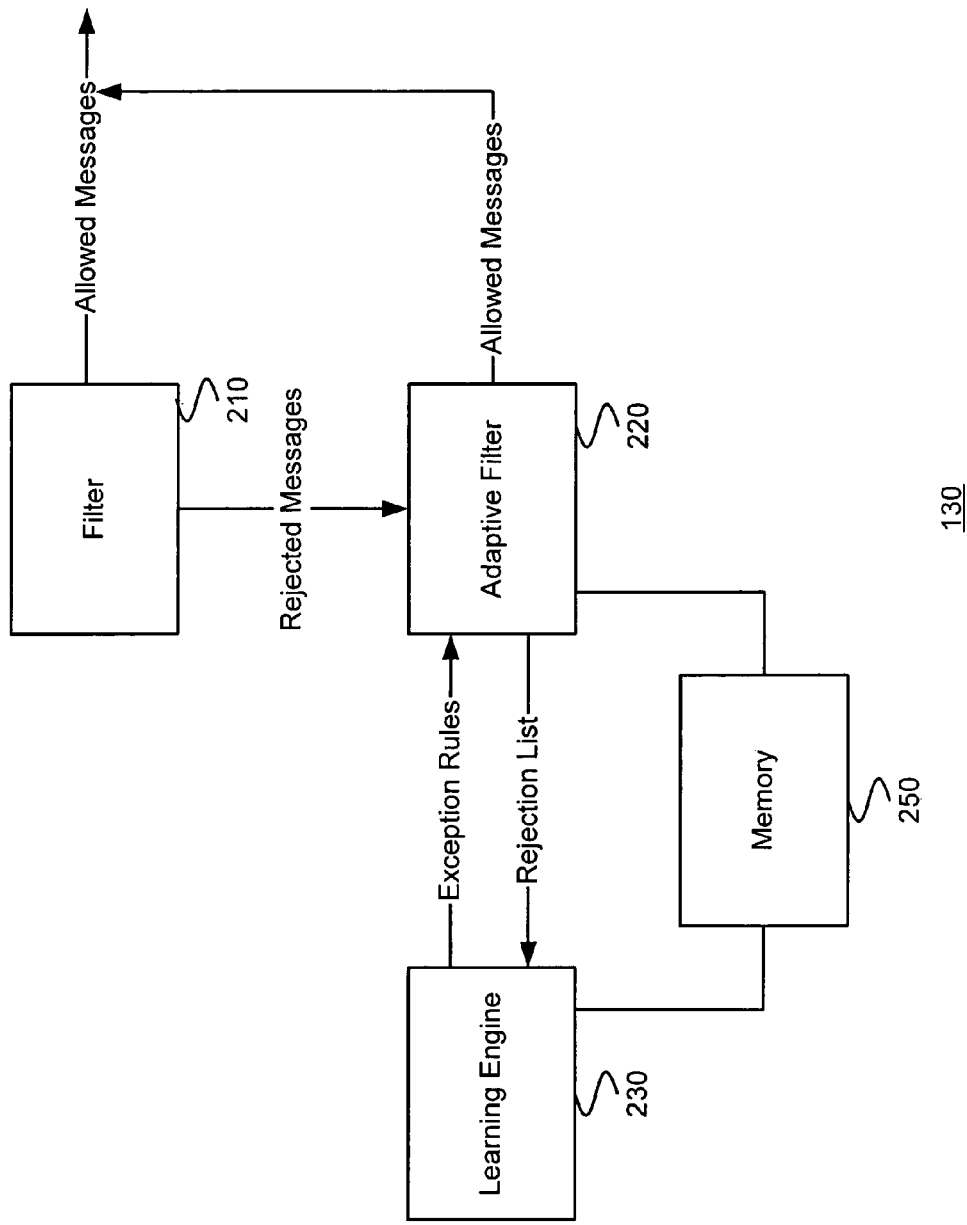
FIG. 2 is a block diagram of an embodiment of a system for adaptively filtering messages.

FIG. 2 is a block diagram of functional modules of security gateway 130. These modules include a message filter 210, an adaptive filter 220, and a learning engine 230. As used herein, the term "module" refers to computer program logic and/or any hardware to provide the functionality attributed to the module.

Message filter 210 is adapted to perform filtering of data as is well-known in the art. Message filter 210 maintains a list of filtering rules, also referred as "rejection rules." Message filter 210 processes rules in a list form, checking messages against the rules in order, until the message is either accepted or rejected. If no rule applies, then the default policy (either reject or accept) is applied. Message filter 210 can be any known product, such as the one developed by Check Point™ Software Technologies, Ltd, of Redwood City, Calif. Message filter 210 passes rejected messages to adaptive filter 220 along with an indication of the rule (or rules) that has caused a rejection and an attribute of the rejected message that triggered the rule.

Adaptive filter 220 receives the rejected message and by default rejects the messages. Adaptive filter 220 generates a rejection list that includes a rejected message, the rule (or rules) that has caused the rejection and an attribute of the rejected message that triggered the rule. Adaptive filter 220 is further adapted to receive exception rules generated by a learning engine 230 (as will be discussed in more detail below) and to apply the exception rules to allow some of the rejected messages.

The learning engine 230 is adapted to receive the rejection list. For each attribute on the rejection list, learning engine 230 maintains a frequency (also referred here is as a "frequency count" or a "count") indicating a number of occurrences of a message with the identified attribute that was rejected by a rule. Learning engine 230 determines whether the frequency count of a message with the identified attribute exceeds a threshold. If the frequency count exceeds the threshold, the learning engine 230 generates exception rules to the rules which would otherwise reject messages with this attribute. Generated exception rules are for high frequency attributes. Since messages with high frequency attributes are not likely to be malicious attacks, but rather more likely to represent legitimate requests, the exception rule allows these legitimate requests to pass through the gateway 130. For example, when a large number of users request a particular URL that is not on the list of allowable URLs, this may indicate that the request is more likely to be a legitimate one, rather than a malicious attack.

In another embodiment, the functionality of adaptive filter 220 is embedded into message filter 210. The exception rules are provided to message filter 210, which is configured to traverse to the exception rule directly from the filtering (rejection) rule. Message filter 210 allows messages to pass through security gateway 130 according to the exception rules.

Memory 250 stores a number of data structures. Memory 250 maintains a rejection list generated by adaptive filter 220. Memory 250 also stores various thresholds, frequency counts, and exception rules.

2. Methods of Operation

Figure 3:
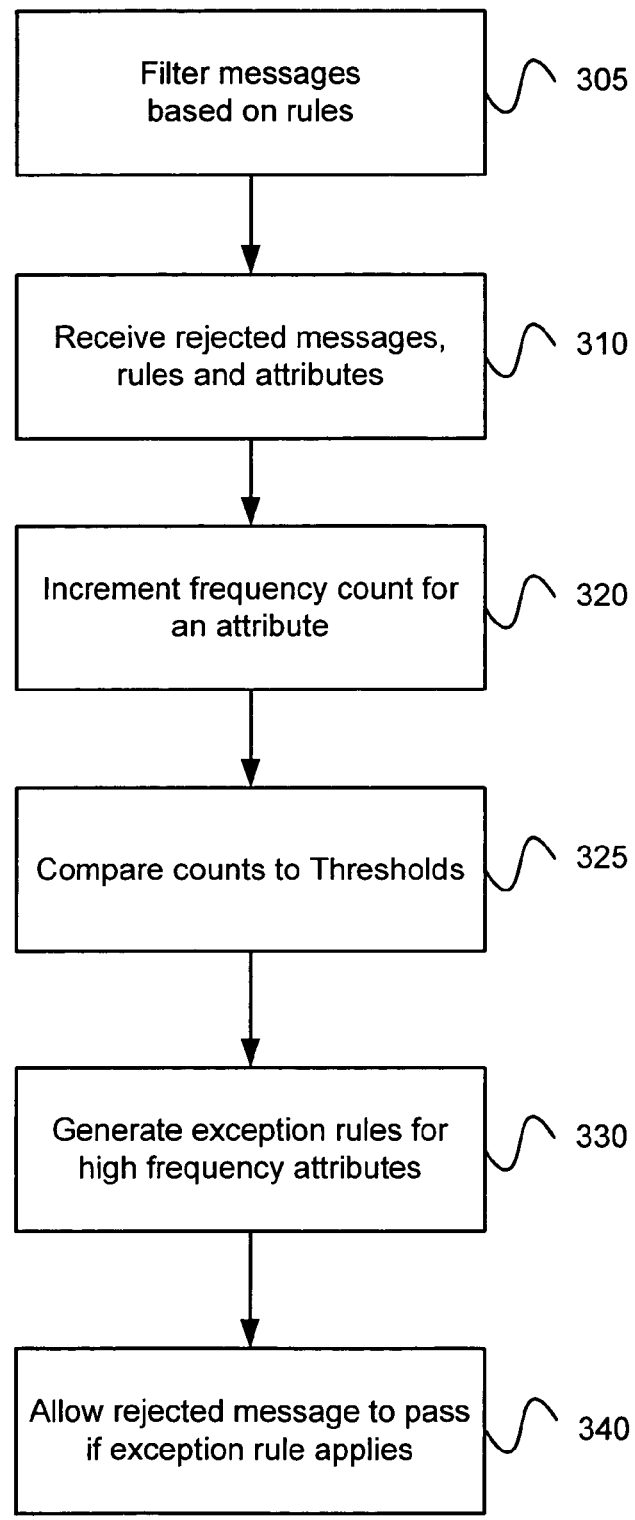
FIG. 3 is a flow chart of a method performed by the security gateway in one embodiment of the present invention.

Referring now to FIG. 3 there is a shown a flowchart of a method of operation in accordance with one embodiment of the invention. Initially, at step 305, message filter 210 receives messages and components thereof and filters the messages using filtering rules. Examples of the received messages are a web page, a URL, and other client-server communications. Examples of the received message components are cookies, form fields, and hidden fields. Messages or components thereof are checked against the rules in order, until the messages are either accepted or rejected. If a message triggers a rejection rule, the message is rejected. If no rule applies, then the default policy (either reject or accept) is applied. Exemplary data filtering rules are shown below in Table 1.

TABLE 1

Filtering Rules

| Rule No. | Rule |
|---|---|
| 1 | Cookies' unique ID fields cannot be tampered |
| 2 | No missing cookie |
| 3 | No extra cookie |
| 4 | Hidden field cannot be of a bigger length than specified |
| 5 | Password field cannot exceed 5 characters and user name field cannot exceed 20 characters |
| 6 | Do not allow URLs that are not on a list of allowable URLs |

At this point it is beneficial to explain the rules listed above in Table 1.
Cookies (Rules 1, 2, and 3)

A cookie is a piece of data given to a web browser running on client 110 by server 120. A session cookie is a cookie that is assigned to a user by server 120 on a per session basis and it is stored on client 110 only for the user session. Session cookies will typically store information in the form of a session identification and may contain related state information for the session. For example, server 120 may issue the following command: set cookie: session ID=12345678. The browser stores the cookie in a file. The value of the cookie is stored on server 120. The cookie is sent back to server 120 each time the web browser requests a web page from the server 120. Message filter 210 checks the cookie against the filtering rules in order. If one of the rules indicates that the cookie session ID field cannot be changed, message filter 210 accesses server 120 to compare the returned cookie value with the stored value. If the returned value is the same as the stored value, the message is allowed to pass (if the message does not trigger any other rule). If the value is different, it triggers rule 1 and the message is rejected. Server 120 stores the new value of the cookie. Message filter 210 forwards the rejected message along with an indication of the rule (or rules) that rejected the message and an attribute of the message that triggered the rule. It should be understood that an attribute can be a message itself, a component of the message, a value of some components of the message itself, or a derived value, such as a data type, a length, count, or any other property, statistical characteristic or the like. Thus, in this example, the attribute is a component of the message, i.e., session ID=12345678.

Similarly, when server 120 sends to a web browser a cookie (or cookies), the web browser has to return to server 120 the same number of cookies. If one of the rules indicates that there should not be any missing cookie, message filter 210 checks the number of cookies sent by the web browser with the number of cookies required by server 120. If the number of cookies returned by the web browser less than the number of cookies required by the server 120, rule 2 is triggered and the message gets rejected with an attribute of the message indicating which cookie is missing. Similarly, if the message triggers rule 3 (it includes an extra cookie) the message is rejected with the attribute indicating the extra cookie.

Hidden Fields and Form Fields (Rules 4 and 5)

Web pages have hidden fields and form fields. A rule may require that a password field or a user login field on a web page cannot exceed a certain number of characters. Each message is checked against filtering rules. If the number of characters provided by a user exceeds a certain number of characters limited by a rule, the rule is triggered. As a result, the message is rejected along with an attribute of the message that triggered the rule, i.e., the length of the field that triggered the rule.

URLs (Rule 6)

In one implementation, message filter 210 stores a list of all URLs that can be requested by a user. All incoming URL requests are checked against this list. If the request is made for a URL that is not on the list, then the request is rejected along with an attribute of the message that triggered the rule. In this case, the attribute is a message itself, i.e., the rejected URL.

It should be noted that security gateway 130 can operate in a learning mode, in a blocking mode, and both in the learning mode and the blocking mode concurrently. In the learning mode, security gateway 130 receives rejected messages, maintains statistics for rejected messages and generates exception rules, which would allow rejected messages to pass. In the blocking mode, security gateway 130 allows rejected messages to pass according to exception rules. When security gateway 130 operates both in the learning mode and the blocking mode concurrently, it checks for an applicable exception rule for the rejected message. If no exception rule is found, security gateway 130 adds the message to the list of rejected messages and updates statistics. These modes of operation are discussed in more detail below.

Referring again to FIG. 3, adaptive filter 220 receives 310 a rejected message along with an indication of the rule (or rules) that rejected the message and an attribute (attributes) of the message that triggered the rule. Adaptive filter 220 updates a rejection list. The elements of the rejection list are tuples (rejected message, rule, and attribute). Exemplary records stored in the rejection list are shown below in Table 2.

TABLE 2

Rejection List

| Message | Rule | Attribute |
|---|---|---|
| User = John; PW = 1234567 | 5 | Length of PW = 7 characters |
| button.x missing | 3 | Button.x |
| Get seen_it cookie = extra | 2 | Seen it cookie |
| www.cnn.com/2004/Jan | 6 | www.cnn.com/2004/Jan |
| User = JackieJackieJackieJackie | 5 | Length of User name = 24 characters |

As shown in Table 2, the first message on the rejection list triggered rule 5 because a user entered the password that exceeded the number of characters allowed to be in the password field of a web form. The attribute is the length of the password field, 7 characters.

The second message triggered rule 3 because cookie button.x was missing when a user sent a new request to server 120. The attribute is the missing button.x cookie.

The third message ended up on the rejection list because seen_it cookie was an extra cookie in the user request to server 120. The attribute is seen_it cookie.

The fourth message was rejected by rule 6 because it was a request for a URL that is not on the list of allowed URLs. The attribute is rejected URL "www.cnn.com/2004/Jan".

Finally, the fifth message was rejected because the user name exceeded 20 characters. The attribute is the length of the user name field, 24 characters.

Adaptive filter 220 forwards the rejection list to learning engine 230. Learning engine 230 maintains a frequency count to indicate a number of occurrences a message with a particular attribute was rejected by a rule.

TABLE 3

Attributes' Frequency Counts

| Rule | Attribute | Count |
|---|---|---|
| 5 | Length of PW = 7 characters | 150 |
| 3 | Button.x | 15 |
| 2 | Seen it cookie | 120 |
| 6 | URL www.cnn.com/2004/Jan | 50 |
| 5 | Length of User name = 24 characters | 160 |

These frequencies create a distribution of different rule violations in terms of various message attributes.

It should be noted that security gateway 130 analyzes messages based on a user session. A user session is a unit of activity that a unique user spends on a web site during a specified period of time. The number of user sessions on a web site is used in measuring the amount of traffic on a particular web site. A web site administrator determines the time frame of a user session (e.g., 30 minutes). If a user comes back to the site within that time period, it is still considered one user session because any number of visits within that time frame will only count as one session. If the visitor returns to the site after the allotted time period has expired, for example, an hour from the initial visit, then it is counted as a separate user session. Accordingly, in one implementation, if more than one message is rejected with the same attribute during a particular user session, the count for that attribute is incremented only once. This type of count is referred to as a "direct" count. For example, if three messages were rejected during one user session because seen_it cookie was an extra cookie, learning engine 230 increments 320 the count for an attribute seen_it cookie only once. This approach is beneficial because it avoids counting duplicate attributes for rejected messages associated with the same user.

Frequency counts can be weighted. A weighted count is incremented depending on other attributes of the message, such as its source. For example, if the message came from a trusted IP address, the weighted count is incremented, for example, by 100. If the message came from a non-trusted IP address, the weighted count is incremented, for example, by 1.

Maintaining frequency counts for each attribute is beneficial because it allows security gateway 130 to examine the patterns of various message rejections. The frequencies are used to generate exception rules that would allow messages with high frequency attributes to pass through security gateway 130.

The learning engine 230 determines 325 which frequency counts exceed a threshold. At this point, it is useful to define how thresholds are calculated. In one implementation, memory 250 stores a sensitivity parameter specified by a system administrator. A system administrator can change the sensitivity parameter via a user interface (not shown).

Let sensitivity parameter S be a fraction of the total number of messages that should be passed by security gateway 130, such as 25%;

Let L be a total number of requests over a predetermined time interval, e.g., 500 messages per minute;

Threshold T is a product of S and L. T=25%×500=125.

If the frequency count of the attribute exceeds the threshold, learning engine 230 generates 330 an exception rule to the rule which would otherwise reject a message with that attribute.

Referring again to Table 3, it is shown that frequency counts for the first, third and fifth attribute in the table exceed the threshold of 125. Learning engine 230 generates 330 exception rules to the rules that rejected messages with these attributes. Exception rules thus describe attributes with high frequency occurrences. A list of generated exception rules is shown below in Table 4. As shown in Table 4, the exception rules are sorted by the rejection rule number.

TABLE 4

Exception Rules

| Rule | Exception |
|---|---|
| 2 | seen_it cookie |
| 5 | Length of PW = 7 characters |
| 5 | Length of User name = 24 characters |

As shown in Table 4, for any given rule, more than one exception rule can be generated. Adaptive filter 220 uses generated exception rules to allow rejected messages, as will be described in more detail below.

Referring again to FIG. 3, once exception rules have been generated for high frequency attributes, adaptive filter 220 may allow some messages to pass according to the exception rules. More particularly, in one implementation, once adaptive filter 220 received a rejected message along with an indication of the rule (or rules) that rejected the message and an attribute (or attributes) of the message that caused the rejection. Adaptive filter 220 traverses the list of all the exception rules generated for the rejection rule. Adaptive filter 220 uses the rejection rule number to index or hash into the list of exception rules. If adaptive filter 220 finds an exception rule that matches the attribute of the rejected message, it allows 340 the message to pass. If the matching exception rule is not found, adaptive filter 220 adds the message to the rejection list and updates the frequency count for the attribute.

To continue with the same example, rule 2 rejected a new message with an attribute: seen_it cookie. Adaptive filter 220 indexes into Table 4 to find all the exception rules generated for rule 2. Adaptive filter 220 then finds the exception rule that matches the attribute of the rejected message (seen_it cookie). Adaptive filter 220 allows the message to pass according to the exception rule.

Alternatively, a list of generated exception rules is provided to message filter 210. Message filter 210 is configured to process rules in a list form, check the messages against the rejection rules, and traverse to the exception rules directly from the filtering rules. If message filter 220 finds an exception rule that matches a rejected message or an attribute thereof, message filter 210 allows the message to pass through security gateway 130 according to the exception rule.

Alternative Embodiment

This embodiment addresses an alternative method of generating exception rules to the rules that reject URL messages.

At this point it will be useful to explain a structure of a typical URL. Assume that the following URLs were rejected by message filter 210:

"http://www.cnn.com/2004/Jan/1/sports.html"
"http://www.cnn.com/2003/Jan/" and
"http://www.cnn.com/2002/Dec"

Each URL string is a combination of the protocol, such as "HTTP://", a host domain name, such as "www.cnn.com", and a directory path, such as 2004/Jan/1/sports. The directory path has one or more URL components, such as "2004," "Jan," "1," and "sports". The directory path may end with a suffix, such as ".html," which indicates the coded format language used to create hypertext documents. The URL components of a directory path are in a hierarchical relationship with each other. For example, in the URL identified by the path www.cnn.com/2004/Jan/1/sports.html, component "2004" is of a higher order than component "Jan." Similarly, component "Jan" is of a higher order than component "1." Higher order components are in an ancestor-descendants relationship with lower order components. For example, component "2004" is a parent of component "Jan" and component "Jan" is a child of component "2004."

In one implementation, learning engine 230 stores all URLs with the same host domain name in a trie structure. Each time a URL with the same host domain name is rejected, a trie structure is updated with that URL. Using trie structures to represent data is well-known in the art. Nodes in a trie structure can be in an ancestor-descendant relationship. A trie structure has a root node, which is the topmost node that has no ancestor nodes. A trie structure also has leaf nodes and internal nodes. An internal node is a node that has one or more child nodes. A leaf node has no children. All children of the same node are siblings.

Figure 4:
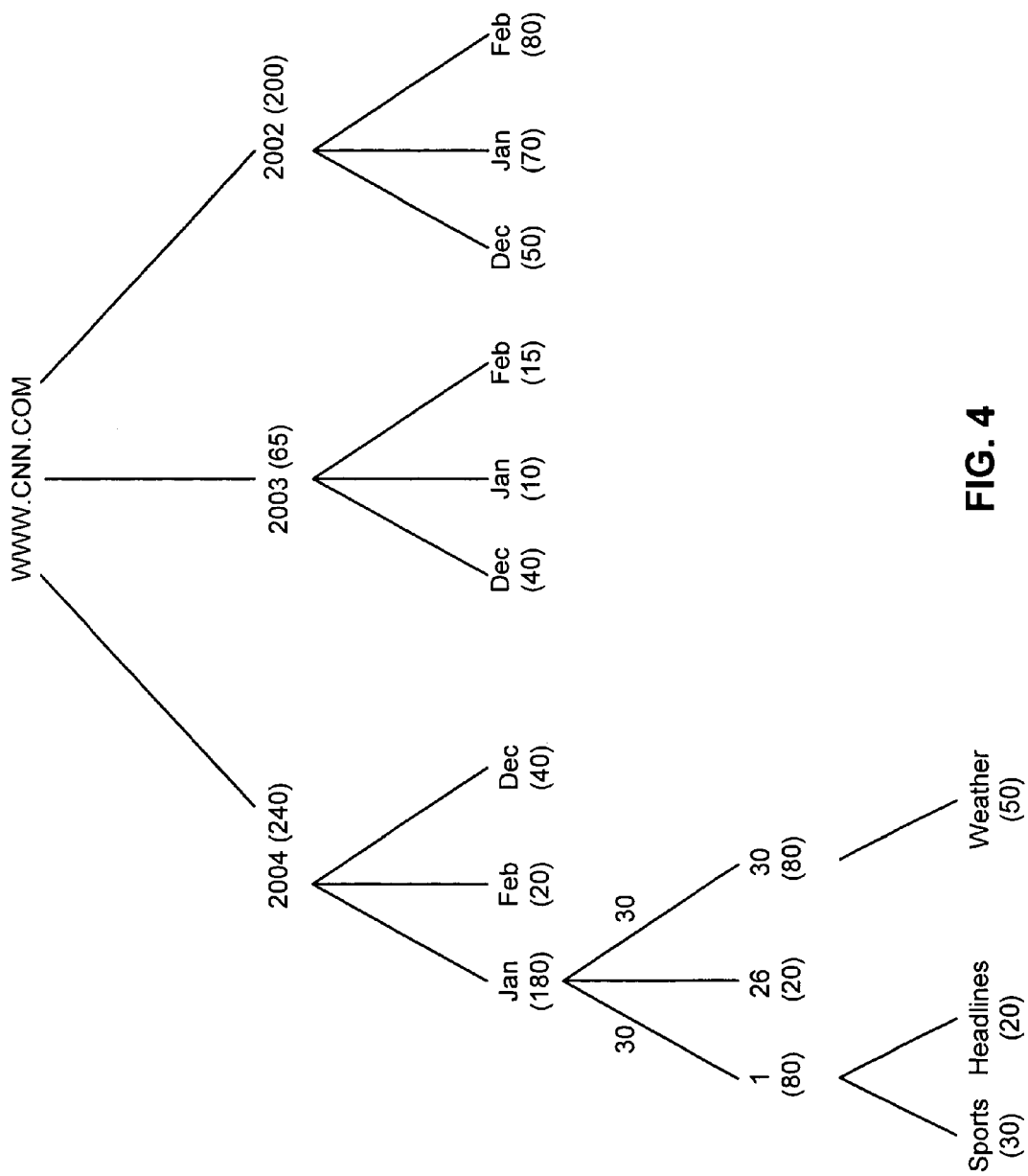
FIG. 4 is a trie structure for storing rejected URLs in another embodiment of the present invention.

Each node in a trie structure is associated with a URL component. FIG. 4 shows a trie structure that stores all rejected URLs with the same domain name www.cnn.com. As shown in FIG. 4, www.cnn.com is a root node of the structure. Each node is associated with a URL component. Each node is referenced by a URL path. For example, nodes "2004," "2003," and "2002" are referenced by URL paths www.cnn.com/2004, www.cnn.com/2003, and www.cnn.com./2002 respectively. Each node "2004," "2003," and "2002" has children, and therefore they are internal nodes. Nodes "sports", "headlines", "Dec", "Jan", and "Feb" are leaf nodes because they have no children.

At each node associated with a URL component of a rejected URL, learning engine 230 also maintains frequency counts indicating a number of occurrences of URLs associated with the nodes which were rejected. It should also be noted that the frequency counts are also maintained at those nodes that are associated with the components of the URLs that were not explicitly requested. These frequency counts are determined as a function of a number of occurrences with which a URL component associated with a node and its descendants were rejected by a rule. An example of the function is a linear function. To illustrate this point, consider the following example.

If rejected URLs are:

a/b/c a/b/d, and a/b, then the counts on leaf nodes c and d are determined as follows:

the count on node c equals the number of times the URL with the path a/b/c was rejected;

the count on node d equals the number of times the URL with the path a/b/d was rejected;

the count on internal node b is determined as follows:

the count on node b=the number of times URLs that include the URL component "b" were rejected.

Thus, if URL a/b/c was rejected 20 times, URL a/b/d was rejected 40 times, and URL a/b was rejected 30 times, the count on b: 20+40+30=90.

If URL a/b were not rejected, then the count on node b: 20+40=60.

Using the algorithm described above, frequency counts are determined for all the nodes in the trie structure shown in FIG. 4 as follows:

The count on the node that includes URL component "1" and referenced by the path "www.cnn.com/2004/Jan/1" is determined as follows:

"www.cnn.com/2004/Jan/1" was rejected 30 times (this number is shown in FIG. 4 on the outgoing edge connecting the nodes referenced by the path "www.cnn.com/2004/Jan" and "www.cnn.com/2004/Jan/1")

"www.cnn.com/2004/Jan/1/headlines.com" was rejected 20 times

"www.cnn.com/2004/Jan/1/sports.com" was rejected 30 times

Accordingly, the total count on the node that includes the URL component "1" and referenced by the path "www.cnn.com/2004/Jan/1"=30+20+30=80.

The count on the node that includes a URL component "Jan" and referenced by the path www.cnn.com/2004/Jan is determined as follows:

"www.cnn.com/2004/Jan/1" was rejected 80 times

"www.cnn.com/2004/Jan/26" was rejected 20 times

"www.cnn.com/2004/Jan/30" was rejected 80 times

Accordingly, the total count on the node referenced by the path "www.cnn.com/2004/Jan"=80+20+80=180.

Table 5 below shows frequency counts for some of the nodes in the trie structure of FIG. 4.

TABLE 5

Frequency Counts for Rejected URLs

| Rejected URL | Frequency Count |
|---|---|
| www.cnn.com/2004/Jan/1/sports.html | 30 |
| www.cnn.com/2004/Jan/1/headlines.html | 20 |
| www.cnn.com/2004/Jan/30/weather.html | 50 |
| www.cnn.com/2004/Jan/1 | 80 |
| www.cnn.com/2004/Jan/26 | 20 |
| www.cnn.com/2004/Jan/30 | 80 |
| www.cnn.com/2004/Jan | 180 |

Figure 5:
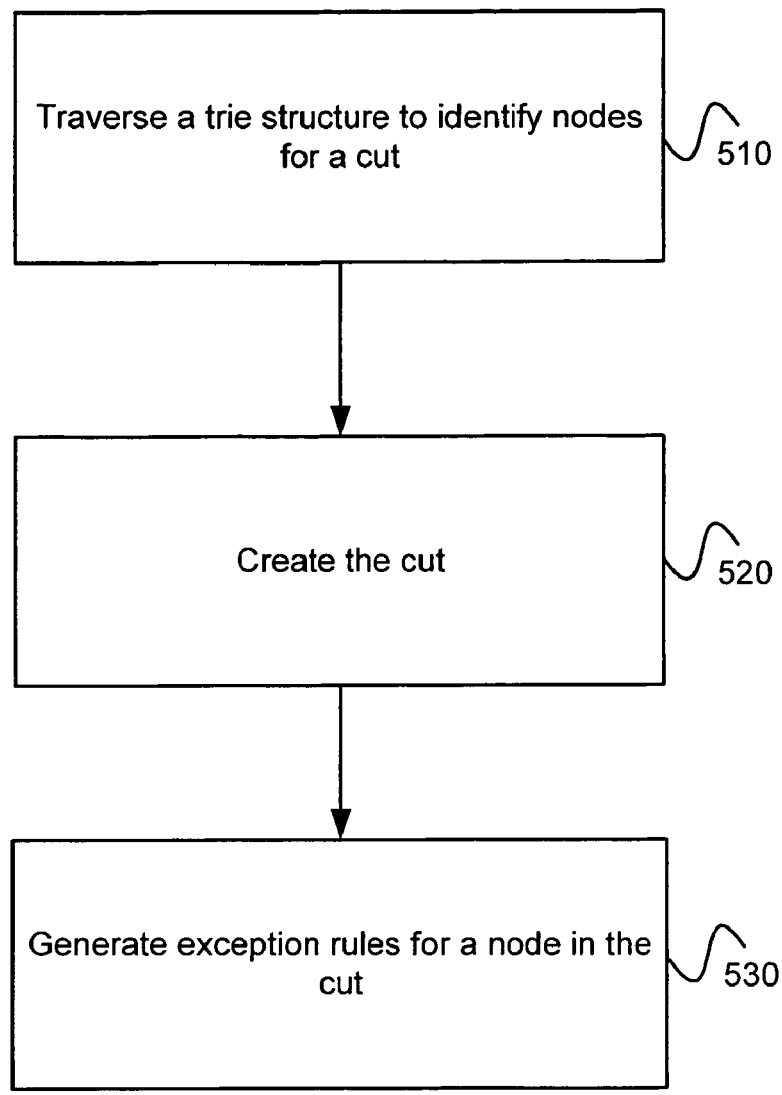
FIG. 5 is a flow chart of a method performed by the security gateway according to another embodiment of the present invention.

Referring now to FIG. 5, it shows a flow chart of a method for generating exception rules to the rules that reject URLs according to this embodiment. Briefly, the method includes the following steps: traversing a trie structure to select a node (or nodes) for a cut and generating exception rules for the selected nodes and their descendants. Those nodes that are not selected in the cut are "dropped", i.e., no exception rules will be generated for these nodes and their descendants.

1. Selecting Nodes for a Cut

At step 510, learning engine 230 traverses the trie structure to select nodes in a cut. The cut is a collection of selected nodes. No node in the cut has an ancestor-child relationship.

Learning engine 230 traverses the trie structure using a depth-first search algorithm. The depth-first search algorithm is a search algorithm that explores the first child node before exploring siblings of that node. In one implementation, to create a cut, learning engine 230 selects the deepest node (furthest from the root node) that meets the following two constraints:

1. the node has a count that exceeds a threshold; and
2. none of the children of the selected node have counts exceeding the threshold.

The above constraints are representative of one known implementation of an algorithm for creating a cut. It should be noted that there are different variations of constraints used to select nodes in the cut. For example, in another implementation, learning engine 230 selects a node with a count exceeding a threshold, without considering the counts of the child nodes.

As described above, in one implementation, the threshold is determined as a product of a sensitivity parameter and the total number of the messages over a certain time interval.

Let sensitivity parameter S be a fraction of URL requests that adaptive filter 220 should allow to pass, such as 10%;
Let L=1000 be a total number of URL requests over a configurable time interval
Threshold $T = S \times L = 10\% \times 1000 = 100$ Continuing with the example shown in FIG. 4, learning engine 230 traverses the trie structure and selects the node referenced by the path www.cnn.com/2004. This node has a count of 240, which exceeds the threshold of 100.

Learning engine 230 continues traversing the structure and selects the child node of that node, which is referenced by the path "www.cnn.com/2004/Jan". This node has a count of 180, which exceeds the threshold of 100. Therefore, learning engine 230 continues traversing the trie structure and selects the child node of that node, which is referenced by the path "www.cnn.com/2004/Jan/1". Learning engine 230 determines that this node has a count of 80, which is below the threshold. Learning engine 230 continues traversing the trie structure and finds that other children of the node identified by the path "www.cnn.com/2004/Jan" have a count of 20 and 80 respectively. These counts do not exceed the threshold of 100.

Learning engine 230 selects the node identified by the path "www.cnn.com/2004/Jan" to be in the cut, at step 520, since this node met the two constraints discussed above. It should be noted that once learning engine 230 finds children with the counts below the threshold, learning engine 230 does not need to traverse to other descendants to determine their counts. In this embodiment the count on any node is always equal or greater of the count of the child node. Accordingly, if the count of the child node does not exceed the threshold, then no descendant nodes of the child node can have a count above the threshold.

Continuing with the example shown in FIG. 4, learning engine 230 continues traversing the trie structure and selects the node that is identified by the path "www.cnn.com/2003". The count on this node is determined as follows: 40+10+15=65. Since the count is below the threshold of 100, this node will not be selected for the cut. Accordingly, no exception rules will be generated for the URL that references this node and its descendants.

Learning engine 230 continues traversing the trie structure and identifies the node referenced by the URL path "www.cnn.com/2002" with the count of 200. Learning engine 230 determines that this node does not have child nodes with the counts that exceed the threshold. Indeed, child nodes identified by URLs "www.cnn.com/2002/Dec", "www.cnn.com/2002/Jan", and "www.cnn.com/2002/Feb" have frequency counts of 50, 70 and 80 respectively. As a result, the node referenced by the URL path www.cnn.com/2002 will be selected for the cut.

2. Exception Rules Generation

Although the children of the nodes in the cut (and therefore their descendants) did not individually meet the threshold (i.e., their frequency counts were below the threshold), their ancestors have counts exceeding thresholds. The current approach assumes that if rejected URLs associated with the descendant nodes collectively met the threshold then the rejected URLs were legitimate requests. Accordingly, exception rules are generated to allow these URLs to pass. This serves to generalize the characteristics of the descendant nodes into an appropriate exception rule.

For each node in the cut, learning engine 230 generates an exception rule, at step 530, that would allow the URLs associated with that node and its descendants to pass.

The exception rule has the format of a typical URL:
<host domain name><directory path>/suffix.
Directory path includes the following components:
<prefix>/data type 1/data type 2/ . . . /data type n/.
Prefix, which is a path from the host domain name, which is a root node in a trie structure, to the node selected for the cut. In our example, prefix for the first selected node is "www.cnn.com/2004/Jan/" and prefix for the second selected node is "www.cnn.com/2002".

The suffix is the common suffix that satisfies all URLs associated with the selected node and its descendants. In our example, suffix .html. satisfies al the URLs associated with the selected node referenced by the path "www.cnn.com/2004/Jan" and its descendants. No suffix is created for the node identified by the path "www.cnn.com/2002" and its descendants.

Data type 1 through data type n are components of the directory path. Data type 1 is a data type of a URL component at a level below "www.cnn.com/2004/Jan", data type 2 is a data type of a URL, component at a level below "www.cnn.com/2004/Jan/1" and so forth. Each data type is determined using a data type inferencing algorithm described in a copending application entitled "Inferencing Data Types of Message Components to Generate Rules that Filter Messages Passing Through Security Gateways," which disclosure is incorporated herein by reference.

Briefly, the scalar data type inferencing algorithm receives a set of keywords, such as URL components, determines whether each keyword is of a known data type, and finds the most restrictive data type that covers at least T percent of keywords, where T is a configurable threshold. The algorithm creates a Directed Acyclic Graph of the data type set. Each node in the graph is associated with a data type in the data type set. Examples of data types are: Date, Time, INT for Integer, CHAR for character. For each data type, a match factor is computed. The match factor is the percentage of keywords that belong to a particular data type. The most restrictive data type is the data type that meets the following two constraints:

1. the match factor of the most restrictive data type exceeds T; and
2. the most restrictive data type does not have child nodes with a match factor exceeding T.

Referring again to the process of generating exception rules for the selected URLs. Learning engine 230 identifies for each selected node the most restrictive data type that covers descendant nodes of the selected node at a given level. Using the algorithm described above, learning engine 230 determines that "INT" is the most restrictive data type that describes the nodes at one level below than the selected node referenced by the path "www.cnn.com/2004/Jan". Data type "CHAR" is the most restrictive data type that describes the nodes at two levels below than the selected node referenced by the path "www.cnn.com/2004/Jan". Data type "INT" is the most restrictive data type is that describes the nodes at one level, below than the selected node referenced by the path "www.cnn.com/2002/". These data types become data types of the components of the generated exception rules.

Continuing with the same example shown in FIG. 4, the following exception rules will be generated:

1. "www.cnn.com/2004/Jan/<INT>/<CHAR>/html" and
2. "www.cnn.com/2002/<INT>".

These exception rules will allow the selected nodes referenced by the following URLs: "www.cnn.com/2004/Jan" and "www.cnn.com/2002" as well as their descendant nodes to pass.

Thus, although the URLs associated with children (and therefore all descendants) of the nodes selected in the cut have not individually met the threshold, they collectively met the threshold. It should be noted that under the frequency-based algorithm described in the preferred embodiment, no exception rules would have been generated to allow the URLs associated with the descendants of the selected nodes to pass, because frequency counts for these URLs are below the threshold.

When adaptive filter 220 receives a rejected URL, it finds a matching exception rule for the rejected URL. For example, if the rejected URL "www.cnn.com/2004/Jan/12/weather.html", adaptive filter 220 finds the exception rule that has a domain name www.cnn.com, components "2004", "Jan", "12", and "weather," and suffix "html." Adaptive filter 220 finds the matching exception rule that has the same domain name and URL components "2004" and "Jan." Adaptive filter 220 determines the data type of URL component 12, which is INT, and the data type of URL component "weather," which is CHAR. Adaptive filter 220 allows the rejected URL "www.cnn.com/Jan112/weather.html" to pass because it matches the exception rule "www.cnn.com/Jan/<INT>/<CHAR>/.html".

Thus, the security gateway uses statistical analysis to identify legitimate messages and to generate exception rules for legitimate messages, which rules would allow similar messages to pass.

The present invention has been described in particular detail with respect to the two possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system Component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for adaptively filtering messages routed across a network by generating exception rules to rejection rules based on attributes of messages previously received and rejected, the method comprising:
    rejecting, by a filter of a security gateway, a first message of a first user session, the first message having an attribute identified by a rejection rule;
    incrementing, by a learning engine of the security gateway responsive to the rejection of the first message, a count representing the number of user sessions having one or more messages rejected based on the attribute;
    rejecting, by the filter, a second message of a second user session, the second message having the attribute identified by the rejection rule;
    incrementing, by the learning engine, the count responsive to the rejection of the second message;
    generating, by the learning engine responsive to determining that the count exceeds a predetermined threshold, an exception rule to the rejection rule identifying the attribute;
    receiving, by the filter after generating the exception rule, a third message of the first user session having the attribute; and
    allowing, by the filter, the third message to pass responsive to the exception rule.

2. The method of claim 1, wherein each user session comprises a pre-determined time frame for communicating messages associated with a user.

3. The method of claim 1, wherein each user session comprises a pre-determined time frame for communicating messages between a user and a server via the security gateway.

4. The method of claim 1, wherein the filter comprises:
    a first component for rejecting messages having the attribute identified by the rejection rule; and
    a second component for allowing messages responsive to an exception rule to the rejection rule.

5. The method of claim 1, further comprising determining, by the learning engine, not to increment the count responsive to a rejection of a fourth message of the first user session, the fourth message rejected after rejecting the first message of the first user session.

6. The method of claim 1, wherein the identified attribute is one of a message component, a value, a data type, and a length.

7. The method of claim 6, wherein the identified attribute comprises one or more of a Uniform Resource Locator (URL) component, a cookie session identifier value, a password field and a user login field.

8. The method of claim 1, further comprising incrementing the count by a weighted value based on a second attribute of the rejected message.

9. The method of claim 1, wherein the threshold is a product of a total number of messages received by the security gateway over a time interval and a percentage of the messages that should be allowed to pass.

10. The method of claim 1, further comprising allowing, by the filter, a message having the attribute to pass responsive to the exception rule, the message received after generating the exception rule.

11. A system for adaptively filtering messages routed across a network by generating exception rules to rejection rules based on attributes of messages previously received and rejected, comprising:
    a filter of a security gateway, rejecting a first message of a first user session, the first message having an attribute identified by a rejection rule;
    a learning engine executing on a processor of the security gateway, incrementing, responsive to the rejection of the first message, a count representing the number of user sessions having one or more messages rejected based on the attribute, wherein
    the filter rejects a second message of a second user session, the second message having the attribute identified by the rejection rule, the learning engine increments the count responsive to the rejection of the second message, and generates, responsive to determining that the count exceeds a predetermined threshold, an exception rule to the rejection rule identifying the attribute, and the filter receives, after generating the exception rule, a third message of the first user session having the attribute, and allows the third message to pass responsive to the exception rule.

12. The system of claim 11, wherein each user session comprises a pre-determined time frame for communicating messages associated with a user.

13. The system of claim 11, wherein each user session comprises a pre-determined time frame for communicating messages between a user and a server via the security gateway.

14. The system of claim 11, wherein the filter comprises:
    a first component for rejecting messages having the attribute identified by the rejection rule; and
    a second component for allowing messages responsive to an exception rule to the rejection rule.

15. The system of claim 11, wherein the learning engine determines not to increment the count responsive to a rejection of a fourth message of the first user session, the fourth message rejected after rejecting the first message of the first user session.

16. The system of claim 11, wherein the identified attribute comprises one of a message component, a value, a data type, and a length.

17. The system of claim 16, wherein the identified attribute comprises one or more of a Uniform Resource Locator (URL) component, a cookie session identifier value, a password field and a user login field.

18. The system of claim 11, wherein the learning engine increments the count by a weighted value based on a second attribute of the corresponding rejected message.

19. The system of claim 11, wherein the threshold is a product of a total number of messages received by the security gateway over a time interval and a percentage of the messages that should be allowed to pass.

20. The system of claim 11, wherein the filter allows a message having the attribute to pass responsive to the exception rule, the message received after generating the exception rule.

* * * * *